United States Patent [19]

Inoue et al.

[11] Patent Number: 4,682,439
[45] Date of Patent: Jul. 28, 1987

[54] FISHINGLINE GUIDE FOR FISHING ROD

[75] Inventors: Koi Inoue; Youki Go; Yoshihiro Naeki, all of Tokyo, Japan

[73] Assignee: Daiwa Seiko Inc., Tokyo, Japan

[21] Appl. No.: 708,515

[22] Filed: Mar. 5, 1985

[30] Foreign Application Priority Data

Mar. 19, 1984 [JP] Japan .................................. 59-52879

[51] Int. Cl.$^4$ ............................................. A01K 87/04
[52] U.S. Cl. ........................................................ 43/24
[58] Field of Search ............................................ 43/24

[56] References Cited

U.S. PATENT DOCUMENTS

| | | | |
|---|---|---|---|
| 2,992,506 | 7/1961 | Garbolino | 43/24 |
| 3,171,228 | 3/1965 | Cwik | 43/24 |
| 4,011,680 | 3/1977 | Rienzo, Sr. | 43/24 |
| 4,156,319 | 5/1979 | Wood . | |
| 4,186,508 | 2/1980 | Howald | 43/24 |
| 4,287,678 | 9/1981 | Yamamoto | 43/24 |
| 4,428,140 | 1/1984 | Yamamoto | 43/24 |

FOREIGN PATENT DOCUMENTS 84075 10/1971 Japan .
115598 8/1975 Japan .

Primary Examiner—Nicholas P. Godici
Assistant Examiner—Carmine Cuda
Attorney, Agent, or Firm—Browdy and Neimark

[57] ABSTRACT

Disclosed is a fishline guide for a fishing rod wherein an intermediate-layer ring made of a thermoplastic synthetic resin incorporating reinforcing fibers is formed integrally between an inner ring made of a hard, abrasion-resistant material, such as metal or ceramics, and a metallic outer ring. Inclined supporting parts and installing parts are continuously formed integrally on the lower side of the intermediate-layer ring on both sides in such a manner that the inclined supporting parts and installing parts partially encompass the outer ring in a secure manner. Also disclosed is a method of producing a fishline for a fishing rod wherein an inner ring of a hard, abrasion-resistant material such as metal or ceramics and a metallic outer ring are concentrically disposed inside molding tools constituted by a pair of opposing upper and lower dies allowing the inner ring and outer ring to be disposed concentrically thereon and having a groove for forming an inclined supporting part and a groove for forming an installing part communicating therewith, and opposing upper and lower slide dies which are respectively fitted into each groove. After a thermoplastic synthetic resin in which reinforcing fibers are mixed is injection-molded from the joint region of the upper and lower slide dies into the space formed inside the molding tools, the forming tools are split so as to form an integral fishline guide.

4 Claims, 7 Drawing Figures

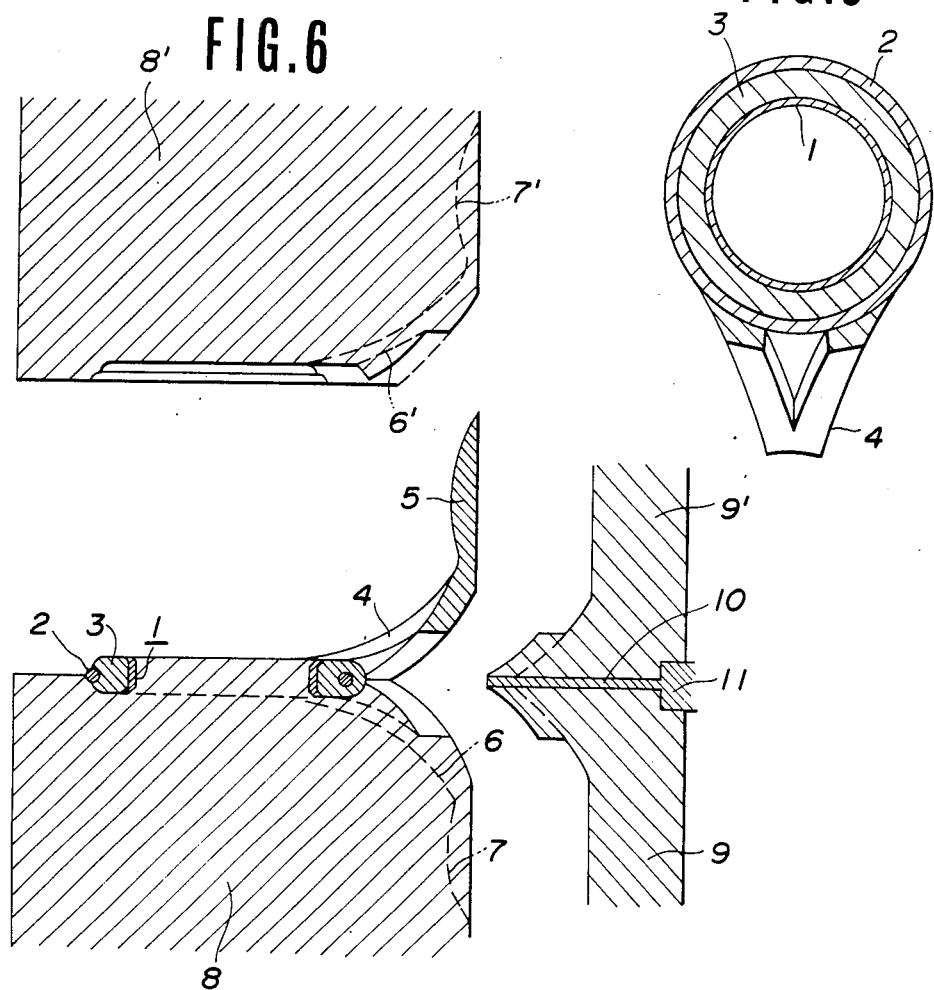
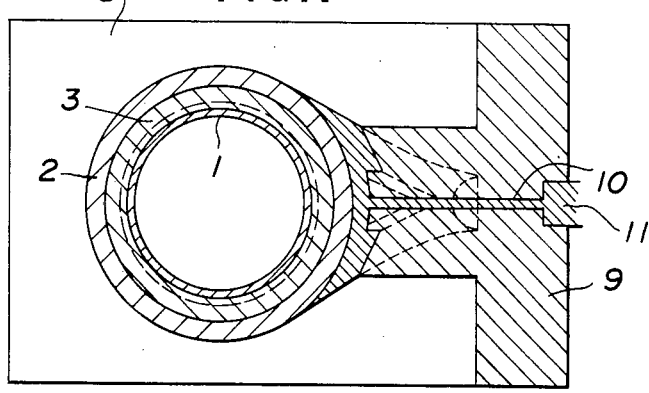

FISHINGLINE GUIDE FOR FISHING ROD

BACKGROUND OF THE INVENTION

1. Field of The Invention:

The present invention relates to a fishline guide for a fishing rod and a method of production thereof.

2. Description of Prior Art:

In the case of a conventional fishline guide for a fishing rod, both the inclined supporting part and the installing part which are used for installing the ring part which holds the fishline parallel with the fishing rod are formed of metal for strength. For instance, as are disclosed in Japanese Patent Publication No. 35/1976 and U.S. Pat. No. 4,287,678, the inclined supporting parts and installing parts are formed integrally in a coupled manner with a metallic outer ring made of an abrasion-resistant material, or they are engaged with a cushioning intermediate-layer ring made of a synthetic resin and are clamped by the outer ring, as seen in Japanese Utility Model Publication No. 2779/1980.

The method of forming a fishing-rod installing part with metal in this way has drawbacks in that it lessens the flexibility of a fishing rod which reduces the operability of the fishing rod, also, the installing parts are easily deformed, easily disengaged by impact or pressure, and the fishline is apt to be entangled in the region where the installing parts project from the outer ring toward both sides or other objects are apt to be caught on the same.

In the specification of U.S. Pat. No. 4,156,319, there is disclosed a method whereby a ring holder, the inclined supporting parts and installing parts are formed integrally by such plastics as nylon. According to this method, however, the fishline guide ring is fitted on the inside of the ring holder, and the lower region of the ring holder is notched, with the result that it has a drawback in terms of strength in that the fishline guide ring is apt to drop off the notched region if an external force is applied from above the ring holder or if the inclined supporting regions are deformed, expanded or shrunk due to the bending of the fishing rod.

SUMMARY OF THE INVENTION

The present invention is designed to overcome these shortcomings. Accordingly, a first object of the present invention is to provide a lightweight fishline guide wherein an intermediate-layer ring, which is provided between an inner ring made of a hard, abrasion-resistant material, such as a metal or ceramics, and an outer ring made of a metal designed to secure both of them, is formed of a thermoplastic synthetic resin in which reinforcing fibers are mixed, and wherein inclined supporting portions and installing parts for installation on a fishing rod are continuously formed integrally with this intermediate-layer ring, so that the strength of the installation parts of the fishline guide vis-a-vis the fishing rod will not decline, the flexiblility of the fishing rod will not be lessened, and the operability of the fishing rod will not be reduced.

Another object of the present invention is to provide a fishline guide wherein, since an inner ring for guiding the fishline has on the outside thereof an intermediate-layer ring made of a thermoplastic synthetic resin with reinforcing fibers and a metallic outer ring, the fishline guide has sufficient strength to mitigate any impact or pressure to which it is subjected, and wherein the inclined supporting parts and installing parts are continuously formed by partially encompassing the lower region of the metallic outer ring with a thermoplastic synthetic resin containing reinforcing fibers, so as to positively prevent the disengagement of the outer ring.

A third object of the present invention is to provide a fishline guide wherein a thermoplastic synthetic resin which forms inclined supporting regions and installing parts and in which reinforcing fibers are mixed is formed integrally with an intermediate-layer ring at the lower securing region of the outer ring, so that the fishline will not get entangled with, nor other objects get caught on, the inclined supporting regions.

Another object of the present invention is to provide a method of producing durable fishline guides which can be easily molded integrally and can be readily mass-produced by concentrically disposing an inner ring made of a hard, abrasion-resistant material and a metallic outer ring into split dies and by injection-molding a thermoplastic synthetic resin in which reinforcing fibers are incorporated.

BRIEF DESCRIPTION OF THE DRAWINGS

FIG. 5 is a vertical side elevational view of said embodiment;

FIG. 6 is an exploded cross-sectional view of molding tools according to the present invention; and FIG. 7 is a horizontal plan view at the time of molding.

PREFERRED EMBODIMENT OF THE INVENTION

Figure 1:
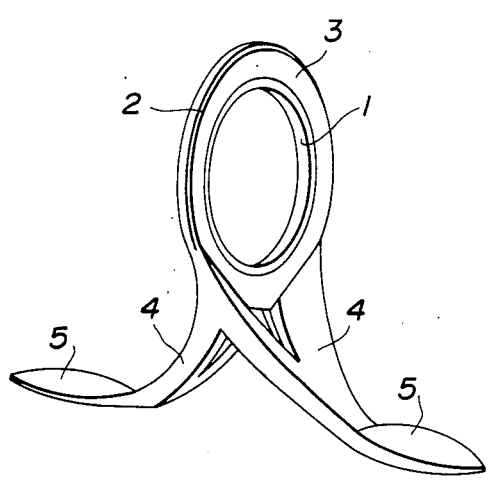
FIG. 1 is a perspective view of an embodiment of the present invention.

Description will be made of an embodiment of the present invention with reference to the attached drawings. An intermediate-layer 3 made of a thermoplastic synthetic resin with reinforcing fibers incorporated therein is integrally secured between an inner ring 1 made of a hard, abrasion-resistant material such as a metal and an outer ring 2 similarly made of a hard, abrasion-resistant material of another metal. At the same time, a pair of inclined supporting parts 4 and a pair of horizontal installing parts 5 are formed continuously and integrally on the lower region of the intermediate-layer ring 3 in such a manner that they are opposed to each other and that the inclined supporting parts 4 partially encompass the outer ring 2 in a secure fashion.

Figure 3:
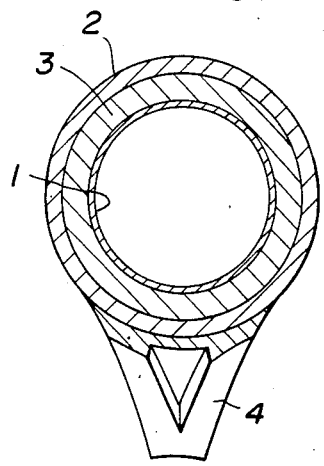
FIG. 3 is a vertical side elevational view of said embodiment.
Figure 2:
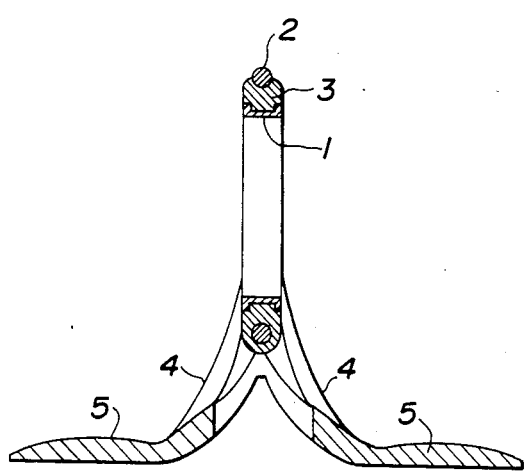
FIG. 2 is a vertical front elevational view of said embodiment.
Figure 4:
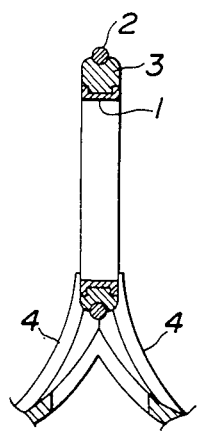
FIG. 4 is a vertical side elevational view of another embodiment of the present invention.

As a method of causing the inclined supporting parts to partially encompass the outer ring 2 in a secure manner, however, there is a case in which the entire lower region of the outer ring 2 is encompassed securely, as shown in FIG. 3, and there is another case in which only the sides of the lower region are encompassed securely as shown in FIG. 5. In each case, the outer ring 2 is caused to be partially clad in an integral and secure state.

Polyamide resin, polycarbonate resin, polyacetal resin, or the like is used as the thermoplastic synthetic resin. Into this synthetic resin is mixed independently or in combination glass fibers and carbon fibers with a diameter of 5–10μ and a length of 0.5–4 mm to the extent of 10–50 wt. %, or silicon carbide with a diameter of 0.1–2μ and a length of 50–200μ or carbon nitride with a diameter of 1–2μ and a length of 0.5–1 mm is mixed in the synthetic resin in an amount of 5–20 wt. %.

Next, description will be made of the method of producing fishline guides according to the present invention. The molding tools comprise the following: a lower die 8 which is capable of placing the inner ring 1 and the outer ring 2 concentrically and in which a groove 6 for forming the inclined supporting part and a groove 7 for forming the installing part are provided in a communicating manner; an upper die 8′ which is similar to and is disposed in opposed relation to the lower die 8; and upper and lower slide dies 9 and 9′ which are respectively fitted to the grooves 6′ and 6, for forming the inclined supporting parts, and the grooves 7′ and 7, for forming the installing parts of these upper and lower dies 8′ and 8. A thermoplastic synthetic resin 11 in which the aforementioned reinforcing fibers are mixed is injected from a resin-injecting hole 10 formed at the joint portion of the upper and lower slide dies 9 and 9′, thereby filling the space in the forming tools. After a fishline guide has been formed integrally, the upper dies 8′ and 8 and the upper slide dies 9′ and 9 are split, and the formed fishline guide is taken out.

Since the intermediate-layer ring for securing the inner and outer rings and the inclined supporting parts and fixing parts for installation on a fishing rod are formed integrally by a thermoplastic synthetic resin with reinforcing fibers and in a manner wherein the outer ring is encompassed partially but securely, it is possible, by taking advantage of the flexibility of the thermoplastic synthetic resin, to mount the fishline guides on a fishing rod smoothly, without lessening flexibility of a fishing rod, unlike the case of conventional metallic installing legs. Since the thermoplastic synthetic resin has its strength heightened by reinforcing fibers and is made integral with the outer ring by partially encompassing the same in a secure manner, it is possible to positively prevent the disengagement of the outer ring while maintaining sufficient durability with respect to any impact or pressure applied from the outside. Since the inclined supporting parts do not project from the outer ring toward both sides, it is possible to guide the fishline without it getting entangled with or caught by other objects, and without impairing the functions if a fishing rod by reducing the weight of the fishline guide itself.

What is claimed is:

1. A fishing guide for a fishing rod, comprising:
an intermediate-layer ring made of a thermoplastic synthetic resin in which reinforcing fibers are mixed, said intermediate-layer ring being formed integrally between an inner ring made of a hard, abrasion-resistant material, such as a metal or ceramics, and a metallic outer ring, and
inclined supporting parts and installing parts continuously formed integrally on the lower region of said intermediate-layer ring on both sides in such a manner that said inclined supporting parts and said installing parts securely encompass at least a portion of said outer ring, as well as in such a manner that said supporting parts do not extend over the entire outer circumferential surface of said intermediate-layer ring lower region.

2. A fishline guide for a fishing rod according to claim 1, wherein the entire lower region of said metallic outer ring is securely encompassed with a thermoplastic resin in which reinforcing fibers are mixed.

3. A fishline guide for a fishing rod according to claim 1, wherein both sides of the lower region of said metallic outer ring are securely encompassed by a thermoplastic synthetic resin in which reinforcing fibers are mixed.

4. A fishline guide for a fishing rod, comprising:
a ring portion including
a first annular member having radially inner and outer surfaces and consisting of thermoplastic synthetic resin mixed with reinforcing fibers;
a metallic second annular member disposed concentrically, and in abutment with the inner surface, of said first member; and
a metallic third annular member disposed concentrically, and in abutment with the outer surface, of said first member;
a support portion secured to, and depending from, a lower region of said ring portion; and
at least one fixing portion integral with, and disposed at one end of, said support portion remote from said ring portion,
said support portion being secured, at an end opposite said one end, integrally with said ring portion first annular member by said reinforced thermoplastic synthetic resin such that at least a portion of the lower region of said ring portion third annular member is encompassed while an upper region of said ring portion third annular member is exposed.

* * * * *